United States Patent
Takeuchi et al.

(10) Patent No.: US 12,436,302 B2
(45) Date of Patent: Oct. 7, 2025

(54) RADIATION IMAGING APPARATUS

(71) Applicant: CANON KABUSHIKI KAISHA, Tokyo (JP)

(72) Inventors: Atsushi Takeuchi, Kanagawa (JP); Koichiro Ohashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 17/857,634

(22) Filed: Jul. 5, 2022

(65) Prior Publication Data
US 2023/0011527 A1    Jan. 12, 2023

(30) Foreign Application Priority Data

Jul. 7, 2021    (JP) .................................. 2021-112565
Sep. 10, 2021   (JP) .................................. 2021-147460

(51) Int. Cl.
 *G01T 1/24*   (2006.01)
 *G01T 1/20*   (2006.01)

(52) U.S. Cl.
 CPC ............... *G01T 1/244* (2013.01); *G01T 1/20* (2013.01); *G01T 1/2012* (2013.01); *G01T 1/20188* (2020.05)

(58) Field of Classification Search
 CPC .................................................... G01T 1/244
 See application file for complete search history.

(56) References Cited

U.S. PATENT DOCUMENTS

| | | | |
|---|---|---|---|
| 8,822,937 B2 | 9/2014 | Koyanagi | |
| 8,901,505 B2 | 12/2014 | Kobayashi et al. | |
| 10,073,180 B2 | 9/2018 | Kobayashi et al. | |
| 10,274,613 B2 | 4/2019 | Suzuki | |
| 10,684,381 B2 | 6/2020 | Horiuchi et al. | |
| 10,921,469 B2 | 2/2021 | Horiuchi et al. | |
| 10,973,476 B2 | 4/2021 | Horiuchi et al. | |
| 2012/0228499 A1 | 9/2012 | Koyanagi | |
| 2013/0077764 A1 | 3/2013 | Noguchi et al. | |
| 2013/0083900 A1 | 4/2013 | Kobayashi et al. | |
| 2013/0259208 A1* | 10/2013 | Watanabe | A61B 6/4283 378/182 |
| 2014/0252229 A1 | 9/2014 | Kondo | |
| 2016/0282482 A1 | 9/2016 | Kobayashi et al. | |
| 2017/0090044 A1 | 3/2017 | Suzuki | |
| 2019/0192093 A1 | 6/2019 | Horiuchi et al. | |
| 2019/0196033 A1 | 6/2019 | Horiuchi et al. | |
| 2019/0196035 A1 | 6/2019 | Horiuchi et al. | |
| 2020/0103539 A1 | 4/2020 | Horiuchi et al. | |

FOREIGN PATENT DOCUMENTS

| | | |
|---|---|---|
| CN | 205359493 U | 7/2016 |
| CN | 10597111 A | 10/2016 |
| CN | 112203389 A | 1/2021 |

(Continued)

*Primary Examiner* — Carolyn Fin
(74) *Attorney, Agent, or Firm* — VENABLE LLP

(57) ABSTRACT

Provided is a radiation imaging apparatus including: a sensor; and a casing enclosing the sensor. The casing includes a front cover, a rear cover arranged at a position opposed to the front cover, and a frame arranged between the front cover and the rear cover. The frame is formed of a plurality of members including two frame members which are mountable to and removable from each other.

14 Claims, 13 Drawing Sheets

(56) References Cited

FOREIGN PATENT DOCUMENTS

| | | |
|---|---|---|
| CN | 112379729 A | 2/2021 |
| JP | 2002-14170 A | 1/2002 |
| JP | 2005-195643 A | 7/2005 |
| JP | 2006-212175 A | 8/2006 |
| JP | 2011-112923 A | 6/2011 |
| JP | 2012-181101 A | 9/2012 |
| JP | 2013-76783 A | 4/2013 |
| JP | 2014-6233 A | 1/2014 |
| JP | 2016-33516 A | 3/2016 |
| JP | 2016-142635 A | 8/2016 |
| JP | 2017-67564 A | 4/2017 |
| JP | 2018-115899 A | 7/2018 |
| JP | 2019-48097 A | 3/2019 |
| JP | 2019-111093 A | 7/2019 |
| JP | 2019-113403 A | 7/2019 |
| JP | 2019-113405 A | 7/2019 |
| JP | 2020-49163 A | 4/2020 |
| JP | 2021-56167 A | 4/2021 |

\* cited by examiner

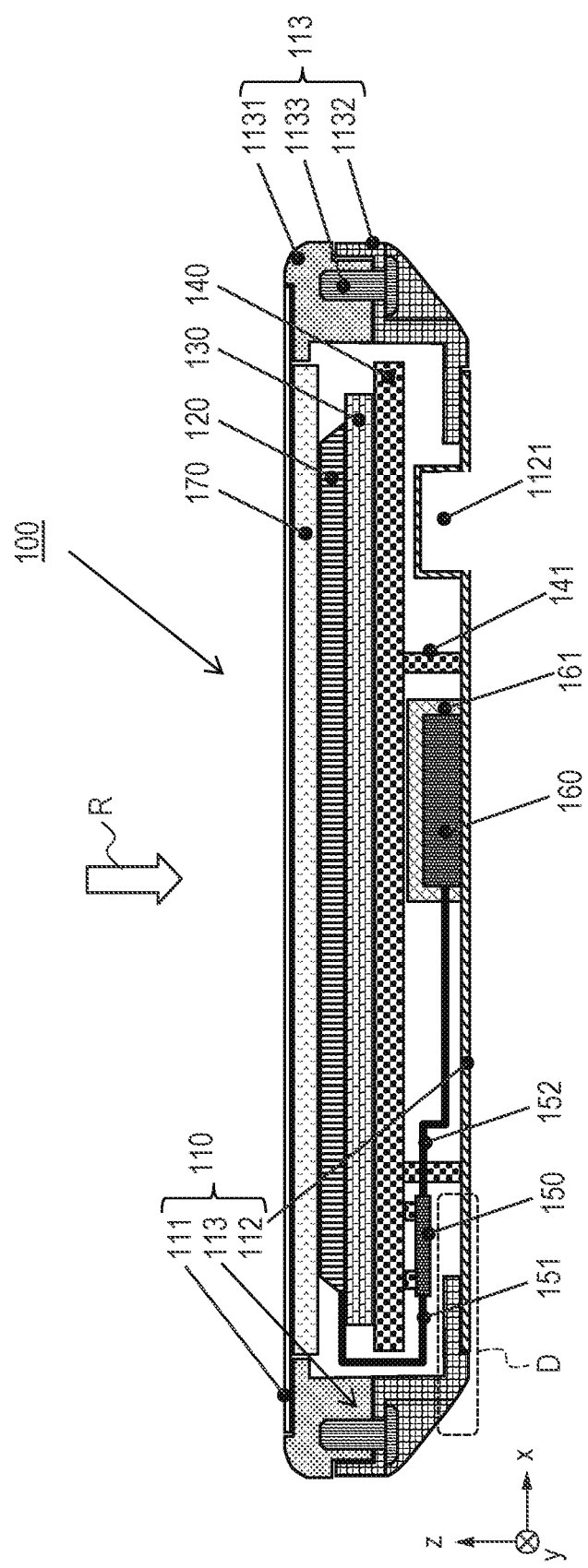

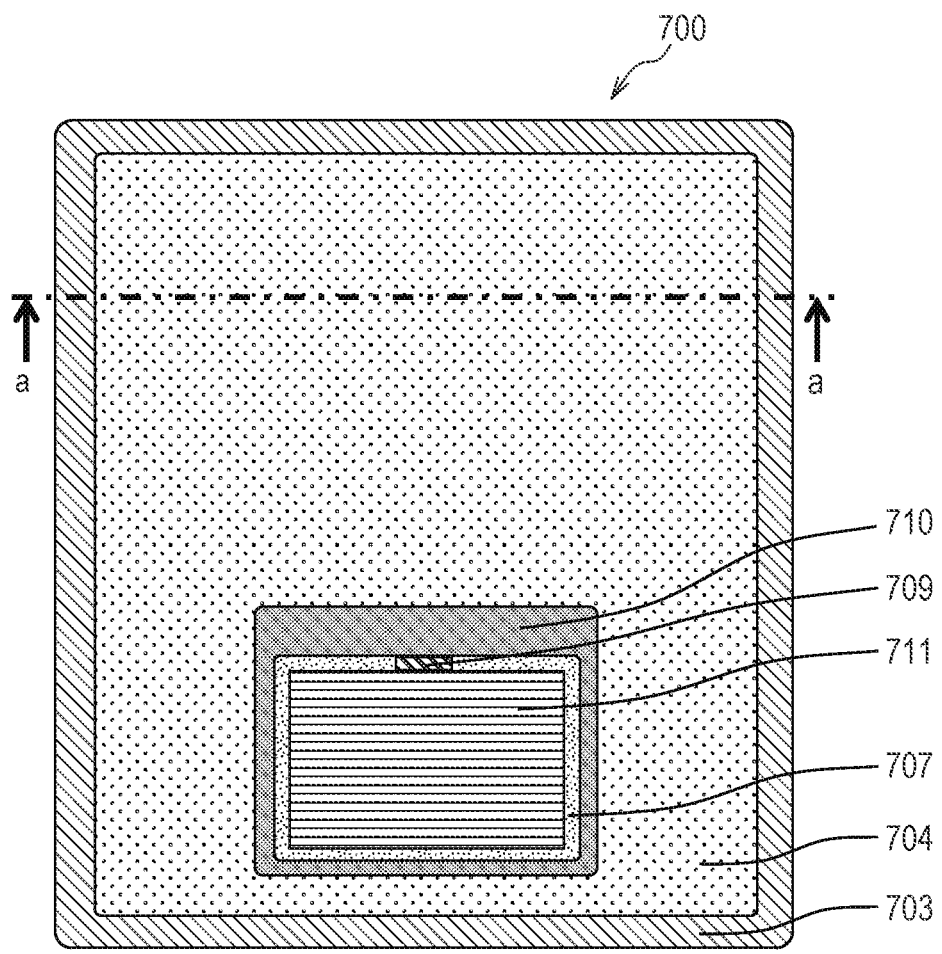
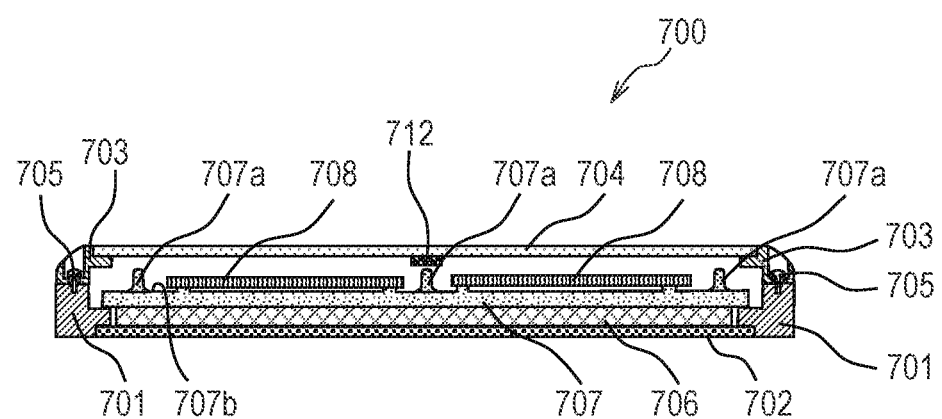

RADIATION IMAGING APPARATUS

BACKGROUND OF THE INVENTION

Field of the Invention

The present invention relates to a radiation imaging apparatus including a sensor for detecting a radiation and converting the radiation into an electrical signal related to a radiation image.

Description of the Related Art

As general systems for radiation imaging, there can be given a film/screen system and a CR system. In those systems, imaging has been performed by putting a photosensitive film or a fluorescent plate for accumulating an image as a latent image into a storage case called a film imaging apparatus standardized by JIS Z 4905 (ISO 4090). Meanwhile, at present, a radiation imaging apparatus using a flat panel detector (FPD), which is a sensor formed of a thin-film semiconductor material on an insulating substrate, is widely used. Further, in medical image diagnosis, a digital radiation imaging apparatus is used for still image photography and moving image photography such as radiography.

In general, the radiation imaging apparatus has been installed and used in a radiation room. However, along with an improvement in mounting technology in recent years in the radiation imaging apparatus, in order to allow quicker imaging of a part in a wider range, a thin and lightweight portable radiation imaging apparatus is commercialized. As a result, there has arisen a situation in which, other than the radiation room, for example, a radiographer carries the radiation imaging apparatus inside a room of a hospital, such as a sickroom or an operating room, to perform imaging. In order to prevent the radiation imaging apparatus from being damaged when the radiation imaging apparatus is carried as described above and accidentally dropped, there has been proposed a radiation imaging apparatus having a resistance against drop impact (see US Patent Application Publication No. 2013/0083900).

Meanwhile, if a casing is to be replaced due to damage of the casing, dirt on the casing, or other reasons, when the casing and the sensor are integrated with each other, the number of components to be replaced and the cost are increased, which may cause a burden on a user. Accordingly, the radiation imaging apparatus is also required to have a configuration in which the casing and the sensor can be separated away from each other. For example, there has also been proposed a radiation imaging apparatus in which the sensor and the casing are joined to each other by a hot melt adhesive, and only the casing or the sensor can be replaced by separating the sensor and the casing away from each other by heating (see Japanese Patent Application Laid-Open No. 2012-181101).

As radiation imaging apparatus to be applied to a medical image diagnosis apparatus or the like, there are a stationary-type radiation imaging apparatus and a portable radiation imaging apparatus. The stationary-type radiation imaging apparatus is used while being fixed to a dedicated imaging table installed in an imaging room, and the portable radiation imaging apparatus can be carried. The portable radiation imaging apparatus is often used while being held by a photographer's hand in order to image each part of a body of a subject to be examined, and is required to have both of lightness in order to improve the portability and an ensured mechanical strength in order to protect internal components from the weight of the subject to be examined, the drop impact, or the like.

In US Patent Application Publication No. 2019/0192093, there is disclosed a configuration including a supporting member for supporting a radiation detecting panel, a plurality of columnar first protrusion portions formed on a surface of the support member on an opposite side of a support surface of the radiation detecting panel, and a second protrusion portion having a length in a direction perpendicular to the support surface, which is shorter than those of the first protrusion portions.

The radiation imaging apparatus as described in US Patent Application Publication No. 2013/0083900 has such a structure that a back member for closing a bottom part opening of a front member is fixed to the front member by thread fastening. Thus, when the radiation imaging apparatus is deformed due to an external force or the like, a stress concentrates at a thread fastening portion. At this time, in order to prevent the back member from being damaged, it is conceivable to take measures such as, regarding the thread fastening portion, increasing the thickness so as to increase the rigidity and adopting a high-rigidity metal material. However, the back member is formed of only one component, and hence those measures of increasing the thickness and adopting the metal material lead to losing the lightness of the radiation imaging apparatus. Moreover, even if the thickness is partially increased only at the thread fastening portion, there is also a risk in that the formability of the component is degraded due to the uneven thickness.

Further, in the radiation imaging apparatus as described in Japanese Patent Application Laid-Open No. 2012-181101, the casing of the radiation imaging apparatus is formed by closing a casing main body portion having openings in its side surfaces with lid members from the side surfaces. In this radiation imaging apparatus, for example, in a case in which the casing is damaged or the like and only the casing is to be replaced, when a constituent unit inside of the casing is to be taken out or the like, an access is required from the narrow side surface of the casing (the access is limited). Accordingly, it is difficult to easily replace only the casing.

As one measure for achieving the lightness of the portable radiation imaging apparatus, there is given thinning of the casing. In order to thin the casing, it is conceivable to use carbon fiber reinforced plastics (CFRP) as the material of the casing. When the casing is made of CFRP so as to be thinned, as compared to a case in which the casing is made of, for example, a metal, the casing is liable to be deformed due to an external force caused when the radiation imaging apparatus is carried or used for imaging or the like. As described in US Patent Application Publication No. 2019/0192093, provision of the protrusion portions on the supporting member allows the mechanical strength to be ensured, but the number of portions that come into contact with the casing is increased as the number of protrusion portions is increased. A contact sound is caused when the casing and the protrusion portion come into contact with each other. Occurrence of the contact sound inside of the casing at the time of carrying or using the radiation imaging apparatus may remarkably reduce the quality of the product.

One aspect of the present invention has been made in view of such problems, and has an object to provide a structure with which lightness of a radiation imaging apparatus can be achieved and only a casing can be easily replaced. Further, another aspect of the present invention has an object to suppress occurrence of a contact sound inside of the casing.

SUMMARY OF THE INVENTION

According to one aspect of the present invention, there is provided a radiation imaging apparatus including: a sensor configured to detect a radiation and convert the radiation into an electrical signal related to a radiation image; and a casing enclosing the sensor, wherein the casing includes a front cover having an incident surface which the radiation enters, a rear cover arranged at a position opposed to the front cover, and a frame arranged between the front cover and the rear cover, and wherein the frame is formed of a plurality of members including two frame members which are mountable to and removable from each other.

Further, according to one aspect of the present invention, there is provided a radiation imaging apparatus including: a casing having a radiation incident surface and a back surface opposed to the radiation incident surface; a radiation detecting panel accommodated in the casing; a supporting member having a panel shape, which is accommodated in the casing, arranged on a back-surface side with respect to the radiation detecting panel, and configured to support the radiation detecting panel; a protrusion portion which is provided on a surface of the supporting member on the back-surface side, and projects in a back-surface direction; and an elastic body arranged between the back surface and the protrusion portion so as to correspond to the protrusion portion.

Further features of the present invention will become apparent from the following description of exemplary embodiments with reference to the attached drawings.

BRIEF DESCRIPTION OF THE DRAWINGS

FIG. 2 is a view for illustrating an example of an internal configuration in a cross section taken along the line A-A of FIG. 1A, in the radiation imaging apparatus according to the first embodiment.

FIG. 7A is a view for illustrating a radiation imaging apparatus according to a third embodiment.

FIG. 7B is a view for illustrating the radiation imaging apparatus according to the third embodiment.

DESCRIPTION OF THE EMBODIMENTS

Now, modes for carrying out the present invention (embodiments) are described with reference to the drawings.

First Embodiment

First, a first embodiment of the present invention is described.

Figure 1A:
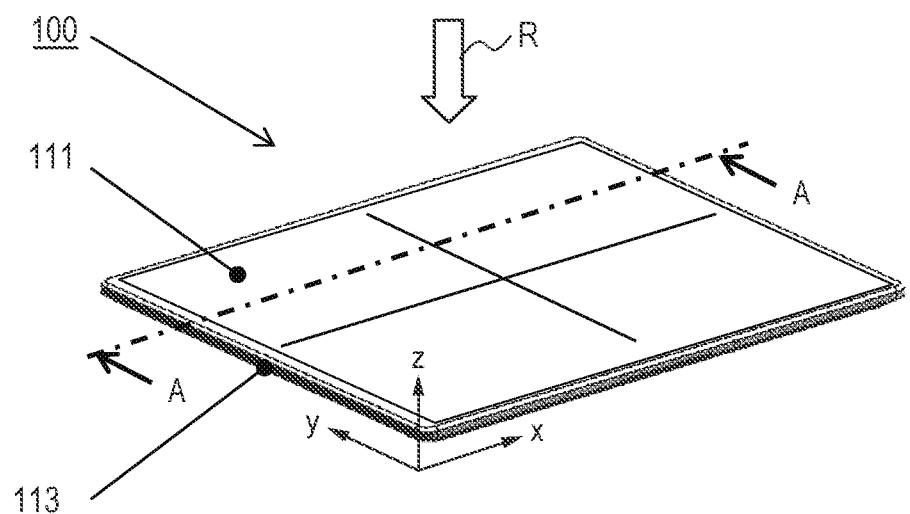
FIG. 1A is a view for illustrating an example of an external appearance of a radiation imaging apparatus according to a first embodiment.
Figure 1B:
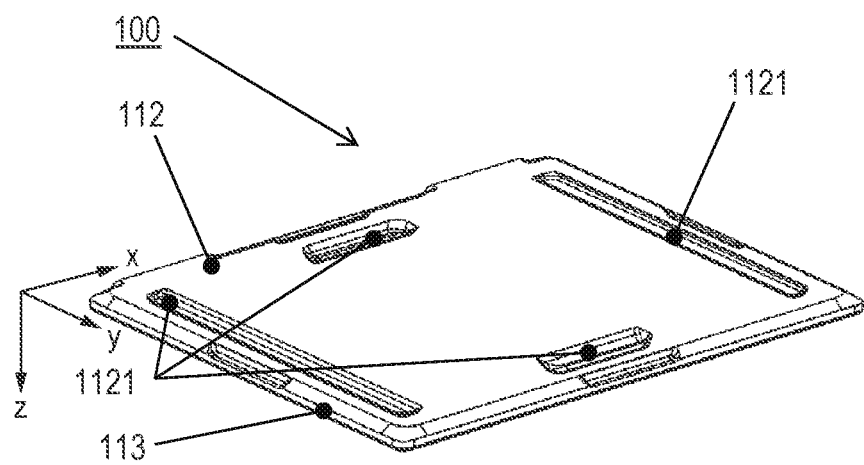
FIG. 1B is a view for illustrating the example of the external appearance of the radiation imaging apparatus according to the first embodiment.

FIG. 1A and FIG. 1B are views for illustrating an example of an external appearance of a radiation imaging apparatus 100 according to the first embodiment of the present invention. Specifically, FIG. 1A is an exterior view obtained by viewing the radiation imaging apparatus 100 according to the first embodiment from a front cover 111 side. The front cover 111 has an incident surface which a radiation R enters. Further, FIG. 1B is an exterior view obtained by viewing the radiation imaging apparatus 100 according to the first embodiment from a rear cover 112 side. The rear cover 112 is arranged at a position opposed to the front cover 111 illustrated in FIG. 1A (at a position on the opposite side of the front cover 111).

In this case, FIG. 1A and FIG. 1B show an xyz coordinate system in which a direction from the radiation imaging apparatus 100 toward the radiation R illustrated in FIG. 1A is represented by a z-direction, and two directions which are orthogonal to this z-direction and are also orthogonal to each other are represented by an x-direction and a y-direction. At this time, in FIG. 1A and FIG. 1B, the direction of the line A-A of FIG. 1A is set as the x-direction. Further, the radiation R illustrated in FIG. 1A may include a radiation that has been transmitted through a subject to be examined (not shown).

The radiation imaging apparatus 100 includes a casing serving as an exterior member. The casing of the radiation imaging apparatus 100 includes the front cover 111 illustrated in FIG. 1A, the rear cover 112 illustrated in FIG. 1B, and a frame 113 illustrated in FIG. 1A and FIG. 1B. The frame 113 is arranged between the front cover 111 and the rear cover 112. The frame 113 has a large opening on each of a side of the incident surface which the radiation R enters and a side of a rear surface positioned on the opposite side of the incident surface. In addition, in the casing of the radiation imaging apparatus 100, the front cover 111 is bonded and fixed through adhesion to the opening on the incident-surface side of the frame 113, and the rear cover 112 is bonded and fixed through adhesion to the opening on the rear-surface side of the frame 113. Further, in the rear cover 112, as illustrated in FIG. 1B, in consideration of easiness of carrying the apparatus by a radiographer or other users, there are arranged a plurality of recess portions 1121 for increasing grip performance at the time of holding the apparatus by hand (fingers).

For example, those plurality of recess portions 1121 can be formed in the vicinity of sides of the frame 113. Further, in balance with arrangement of internal constituent units of the radiation imaging apparatus 100, for example, those plurality of recess portions 1121 can be arranged deeper and over a wider range. When the casing of the radiation imaging apparatus 100 is configured as described above, the internal constituent units of the radiation imaging apparatus 100 are protected.

FIG. 2 is a view for illustrating an example of an internal configuration in a cross section taken along the line A-A of FIG. 1A, in the radiation imaging apparatus 100 according to the first embodiment of the present invention. In FIG. 2, configurations similar to the configurations illustrated in FIG. 1A and FIG. 1B are denoted by the same reference symbols, and detailed description thereof is omitted. Further, FIG. 2 shows an xyz coordinate system corresponding to the xyz coordinate system illustrated in FIG. 1A and FIG. 1B.

As illustrated in FIG. 2, a casing 110 of the radiation imaging apparatus 100 includes the front cover 111, the rear cover 112, and the frame 113. The front cover 111 has, as described above, the incident surface which the radiation R enters. Further, the rear cover 112 is, as described above, arranged at a position opposed to the front cover 111 (position on the opposite side of the front cover 111). Moreover, the frame 113 forms a side surface (side wall) of the radiation imaging apparatus 100, and is arranged between the front cover 111 and the rear cover 112.

Further, the frame 113 is formed of a plurality of members including two frame members (front frame member 1131 and rear frame member 1132) which are mountable to and removable from each other. Specifically, as illustrated in FIG. 2, the frame 113 includes the front frame member 1131, the rear frame member 1132, and fixing members 1133. The front frame member 1131 is a frame member arranged on the front cover 111 side. The rear frame member 1132 is a frame member which is arranged on the rear cover 112 side, and is to be coupled to the front frame member 1131. In addition, the fixing member 1133 is a member for coupling the front frame member 1131 and the rear frame member 1132 to each other. The front frame member 1131 and the rear frame member 1132 are coupled to each other through intermediation of the fixing members 1133 so as to be integrated as the frame 113.

The casing 110 of the radiation imaging apparatus 100 encloses a scintillator layer 120, a photoelectric converter 130, a base 140, an electric board 150, flexible cables 151 and 152, a battery 160, a battery holder 161, and a spacer layer 170.

The scintillator layer 120 is arranged on a side on which the radiation R enters the scintillator layer 120 with respect to the photoelectric converter 130. The scintillator layer 120 is a fluorescent layer for converting the radiation R which has entered the scintillator layer 120 (which may also include a radiation transmitted through the subject to be examined (not shown)) into visible light. As a constituent material of the scintillator layer 120, in general, CsI or GOS ($Gd_2O_2S$) is used. The photoelectric converter 130 is a constituent unit for detecting the light (visible light) generated in the scintillator layer 120 and converting the light into an electrical signal related to a radiation image. This photoelectric converter 130 includes a substrate and a plurality of pixels (each pixel includes a photoelectric conversion element) two-dimensionally arranged on the surface of the substrate. The scintillator layer 120 and the photoelectric converter 130 described here are configurations corresponding to a "sensor" for detecting the radiation R which has entered the sensor and converting the radiation R into the electrical signal related to the radiation image. In the first embodiment, a flat panel detector (FPD) may be applied as the sensor formed of the scintillator layer 120 and the photoelectric converter 130.

The base 140 is a base for supporting the sensor formed of the scintillator layer 120 and the photoelectric converter 130. Further, the base 140 abuts against the rear cover 112 of the casing 110 by a rib 141. Further, the base 140 and the photoelectric converter 130 are bonded and integrated with each other through intermediation of a pressure-sensitive adhesive layer (not shown) such as a double-sided tape. The base 140 and the photoelectric converter 130 may be bonded to each other through intermediation of, other than the pressure-sensitive adhesive layer such as the double-sided tape described here, other joining measures such as adhesion using an adhesive. Further, the base 140 can be made of a lightweight and high-rigidity material, such as aluminum, magnesium, other metals, or a carbon fiber reinforced resin. Further, in order to achieve positional restriction inside of the casing 110 under a state in which the base 140 is integrated with the photoelectric converter 130 or the like, the following configuration may be adopted in the z-direction. That is, in a +z-direction of the base 140, the spacer layer 170 is interposed between the base 140 and the front cover 111, and in a −z-direction of the base 140, the rib 141 or a spacer (not shown) is interposed between the base 140 and the rear cover 112. Thus, the positional restriction inside of the casing 110 is performed.

Meanwhile, regarding the positional restriction in an xy-plane direction of the base 140 inside of the casing 110, for example, there may be applied fitting between the base 140 and the frame 113 or arrangement of a cushioning material (not shown), such as an elastomer material or a foamed material, in a gap between the base 140 and the frame 113. For example, when the cushioning material (not shown) is arranged in the gap between the base 140 and the frame 113, deformation of the cushioning material with respect to the impact applied from the side surface of the casing 110 can relax the impact to be transmitted to the photoelectric converter 130 or the base 140.

The electric board 150 is arranged on a side of the base 140 opposite to a surface of the base 140 bonded to the photoelectric converter 130, and is electrically connected to the photoelectric converter 130 via the flexible cable 151. This electric board 150 reads out the electrical signal related to the radiation image from the photoelectric converter 130 via the flexible cable 151, and generates image data of the radiation image by performing image processing or the like. The image data of the radiation image generated in this electric board 150 is, for example, transmitted and displayed on an external display system. As a communication method used in this case, any communication connection of wired connection or wireless connection may be used. In the case of wireless connection, the 2.4 GHz band or the 5 GHz band is mainly used. With those communication methods, the image data of the radiation image is transferred and displayed on a PC, a tablet, or the like, and thus the user can recognize the radiation image.

The battery 160 is removably held by the battery holder 161. The battery holder 161 is mounted to the rear cover 112, and the battery 160 is mountable and removable from the rear cover 112 side of the radiation imaging apparatus 100. A mode in which the battery holder 161 is mounted to the rear cover 112 has been described here, but there may be employed a mode in which, for example, an opening is formed in the rear cover 112, and the battery holder 161 is mounted to the base 140 through this opening. When the battery 160 is mounted to the battery holder 161, power of the battery 160 is supplied to the electric board 150 via the flexible cable 152, and is further supplied to the photoelectric converter 130 or the like via the flexible cable 151. In this case, the battery 160 is a secondary battery, and, for example, a capacitor may be applied.

The spacer layer 170 is a layer arranged between the scintillator layer 120 and the front cover 111.

In the rear cover 112, the recess portions 1121 recessed in a direction inward of the casing 110 are formed. In this case, in the first embodiment, each of the recess portions 1121 may have, in consideration of the easiness of carrying the radiation imaging apparatus 100 and the difficulty of dropping the radiation imaging apparatus 100 by the radiographer or other users, a depth of, for example, ½ or more of the thickness of the radiation imaging apparatus 100 in a direction (z-direction) in which the radiation R enters the radiation imaging apparatus 100.

Next, details of the front cover 111, the rear cover 112, and the frame 113 forming the casing 110 are described below.

The front cover 111 can be made of a lightweight and high-rigidity carbon fiber reinforced resin which is a material capable of easily transmitting the radiation R. Further, the rear cover 112 can be made of a lightweight and high-rigidity metal material, such as an aluminum alloy or a magnesium alloy, or a lightweight and high-rigidity resin material such as a carbon fiber reinforced resin. Further, the frame 113 can be made of a lightweight and high-rigidity metal material, such as an aluminum alloy or a magnesium alloy, or a carbon fiber reinforced resin. When the front cover 111 (and also the rear cover 112 as required) is made of a carbon fiber reinforced resin, a carbon fiber part corresponds to a "conductive part" which easily conducts electricity, and a resin part corresponds to a "non-conductive part" which is difficult to conduct electricity. In this case, the carbon fiber part corresponding to the "conductive part" of the front cover 111 (and also the rear cover 112 as required) may be electrically connected to the frame 113. With this configuration, even when the front cover 111 or the like is charged with static electricity or the like, the static electricity or the like is transmitted to the frame 113 side, and hence the internal constituent units of the casing 110 can be protected from the static electricity or the like.

The frame 113 includes, as described above, the front frame member 1131, the rear frame member 1132, and the fixing members 1133. The front cover 111 is fixed to the front frame member 1131 by an adhesive or the like. The rear cover 112 is fixed to the rear frame member 1132 by an adhesive or the like. The fixing member 1133 is a member for coupling and integrating the front frame member 1131 and the rear frame member 1132 with each other. The fixing members 1133 are arranged at predetermined intervals over the entire circumference of the frame 113. When those fixing members 1133 are removed so that the two frame members being the front frame member 1131 and the rear frame member 1132 are separated away from each other, the casing 110 and the constituent unit inside of the casing 110 (including the above-mentioned "sensor") can be separated away from each other. As this fixing member 1133, a fastening member such as a screw is suitable.

In the first embodiment, at least one of the two frame members being the front frame member 1131 and the rear frame member 1132 can be made of a metal. With this configuration, a mechanical strength such as a drop resistance of the radiation imaging apparatus 100 can be improved. Further, when the front frame member 1131 and the rear frame member 1132 are coupled to each other via the fixing members 1133, the front frame member 1131 and the rear frame member 1132 are brought into an electrically connected state through contact.

The front cover 111 and the front frame member 1131 are fixed to each other by a joining layer (not shown). In this case, when, for example, an adhesive is used as the joining layer, it is not required to increase the thickness of the front cover 111, and the lightness is not lost. Further, when, for example, an adhesive is used as the joining layer, because no fastening member is exposed to an exterior surface unlike thread fastening, external appearance and cleanability are improved, and high airtightness and watertightness can be achieved. Further, in order to avoid warping and peeling from the adhesive layer at the time of temperature change, which are caused due to a difference in coefficient of linear expansion between the front cover 111 and the front frame member 1131, an elastic adhesive can be used as the joining layer. Further, in order to increase the adhesive strength between the adhesive layer and each of the front cover 111 and the front frame member 1131 being an adherend member, the surface of the adherend member can be roughened so that the adhesive strength is improved owing to an anchor effect. Thus, the peeling risk of the adhesive can be reduced, and the joining can be performed with high reliability. The joining layer is not limited to the adhesive described here, and a pressure-sensitive adhesive such as a tape may be adopted. Joining between the front cover 111 and the front frame member 1131 has been described here, but the same holds true also for joining between the rear cover 112 and the rear frame member 1132. It is not always required to adopt the same joining layer for the joining layer between the front cover 111 and the front frame member 1131 and the joining layer between the rear cover 112 and the rear frame member 1132.

Each of the front cover 111 and the rear cover 112 has, in consideration of the lightness, a thin-wall-molded substantially flat plate shape, and the front cover 111 and the rear cover 112 form the front surface and the rear surface of the casing 110, respectively. In this case, in the first embodiment, at least one of the front cover 111 or the rear cover 112 can be made of a material having a specific gravity smaller than that of the frame 113. Meanwhile, the front frame member 1131 and the rear frame member 1132 form the side surface (side wall) of the casing 110. When the front frame member 1131 and the rear frame member 1132 are configured to be mountable to and removable from each other through use of the fixing members 1133 while giving resistance against impact such as dropping, the casing 110 and the internal constituent unit can be separated away from each other.

In the first embodiment, from the viewpoint of electromagnetic shielding performance as the entire casing 110, members forming the casing 110 can be electrically connected to each other. Specifically, the front cover 111 and the front frame member 1131, the front frame member 1131 and the rear frame member 1132, and the rear frame member 1132 and the rear cover 112 can be electrically connected to each other. Among those, configuration examples of electrical connection between the rear frame member 1132 and the rear cover 112 are described below with reference to FIG. 3A to FIG. 3D.

FIG. 3A to FIG. 3D are enlarged views for illustrating configuration examples of a region D illustrated in FIG. 2, in the radiation imaging apparatus 100 according to the first embodiment of the present invention.

Figure 3A:
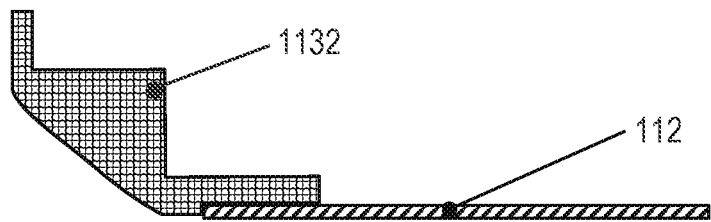
FIG. 3A is an enlarged view for illustrating a configuration example of a region D illustrated in FIG. 2, in the radiation imaging apparatus according to the first embodiment.

FIG. 3A shows an electrical connection method through contact of mating surfaces between the rear frame member 1132 and the rear cover 112. This electrical connection method illustrated in FIG. 3A does not require other members for electrical connection, and is thus a low-cost simple method.

Figure 3B:
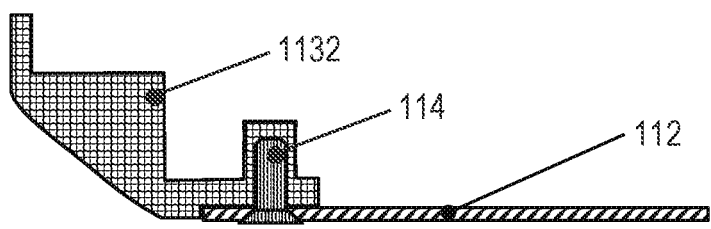
FIG. 3B is an enlarged view for illustrating a configuration example of the region D illustrated in FIG. 2, in the radiation imaging apparatus according to the first embodiment.
Figure 3C:
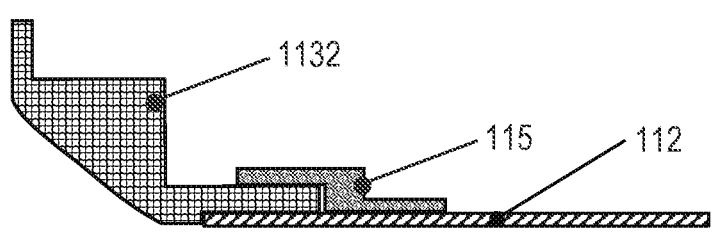
FIG. 3C is an enlarged view for illustrating a configuration example of the region D illustrated in FIG. 2, in the radiation imaging apparatus according to the first embodiment.
Figure 3D:
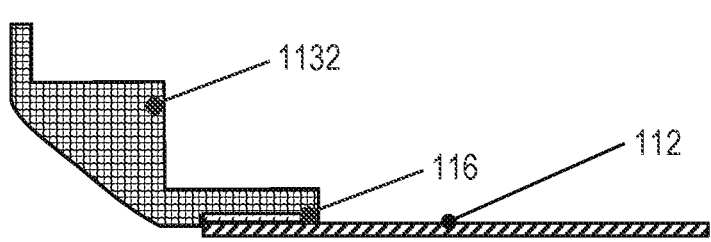
FIG. 3D is an enlarged view for illustrating a configuration example of the region D illustrated in FIG. 2, in the radiation imaging apparatus according to the first embodiment.

However, when electrical connection using surface contact is difficult because a joining member such as an adhesive is interposed between the rear frame member 1132 and the rear cover 112, a conductive member can be fixed so as to straddle between those two components so that the electrical connection is achieved. Specifically, as illustrated in FIG. 3B, there can be applied a method of achieving electrical connection by fastening the rear frame member 1132 and the rear cover 112 to each other by a metal screw 114. Further, as illustrated in FIG. 3C, there can also be applied a method of achieving electrical connection by bonding a conductive tape 115 so as to straddle between the two components being the rear frame member 1132 and the rear cover 112. Moreover, as illustrated in FIG. 3D, there can also be applied a method of achieving electrical connection by joining the two components being the rear frame member 1132 and the rear cover 112 through intermediation of a conductive joining member 116 which has conductivity itself.

As described above, in the radiation imaging apparatus 100 according to the first embodiment, the casing 110 is configured as follows. That is, the frame 113 arranged between the front cover 111 and the rear cover 112 is formed of a plurality of members including the front frame member 1131 and the rear frame member 1132 which are the two frame members mountable to and removeable from each other. With this configuration, the front frame member 1131 and the rear frame member 1132 are mountable to and removeable from each other in a reversible fashion. Thus, the lightness of the radiation imaging apparatus 100 can be achieved, and only the casing 110 can be easily replaced even when, for example, the casing 110 is damaged.

Second Embodiment

Next, a second embodiment of the present invention is described. In the following description of the second embodiment, a description of matters common to the first embodiment described above is omitted, and matters different from those of the first embodiment described above are described.

In the above-mentioned first embodiment, the mode in which the rear cover 112 to be mounted to the rear frame member 1132 has a substantially rectangular shape has been described. That is, the mode in which the rear frame member 1132 has one substantially-rectangular opening on the side of the rear surface positioned on the opposite side of the incident surface which the radiation R enters, and the rear cover 112 is mounted to this opening has been described.

When the front frame member 1131 is made of a metal material, in order to prevent the front frame member 1131 from covering an imaging region, the opening on the incident-surface side of the front frame member 1131 can have an outer shape that is equal to or larger than an effective pixel region of the photoelectric converter 130. Meanwhile, regarding the rear frame member 1132, there is no restriction in terms of outer shape from this viewpoint. When the opening on the rear-surface side of the rear frame member 1132 is increased in size, that is, when the thin and lightweight rear cover 112 is increased in size, the weight can be reduced. In this case, in balance with the strength and the like, a region of the rear frame member 1132 may partially extend so that the rear cover 112 has a cut-out shape only in this extending part. This mode is described below as the second embodiment.

Figure 4:
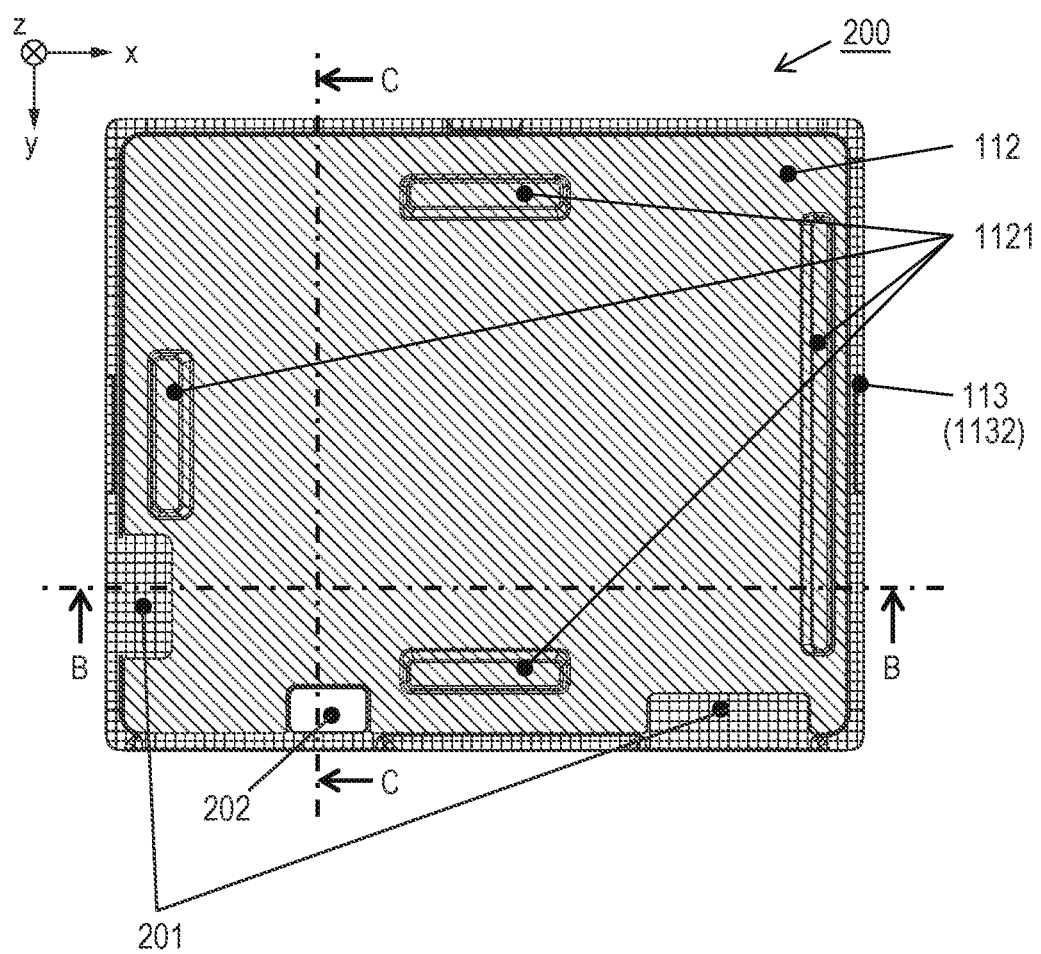
FIG. 4 is an exterior view as viewed from a rear cover side, in a radiation imaging apparatus according to a second embodiment.

FIG. 4 is an exterior view as viewed from the rear cover 112 side, in a radiation imaging apparatus 200 according to the second embodiment of the present invention. In FIG. 4, configurations similar to the configurations illustrated in FIG. 1A to FIG. 3D are denoted by the same reference symbols, and detailed description thereof is omitted. Further, FIG. 4 shows an xyz coordinate system corresponding to the xyz coordinate system illustrated in FIG. 1A to FIG. 2.

The second embodiment is the same as the above-mentioned first embodiment in the structure in which, as illustrated in FIG. 4, the rear cover 112 is fixed to the opening on the rear-surface side of the rear frame member 1132 of the frame 113. However, the second embodiment is different from the first embodiment in that, as illustrated in FIG. 4, the rear frame member 1132 of the frame 113 partially includes extending portions 201 projecting to the inner side of the rear cover 112 when viewed from the rear cover 112 side. Further, the second embodiment is different from the first embodiment also in that, as illustrated in FIG. 4, a lid member 202 is provided so as to cover an opening formed in the rear cover 112.

Figure 5:
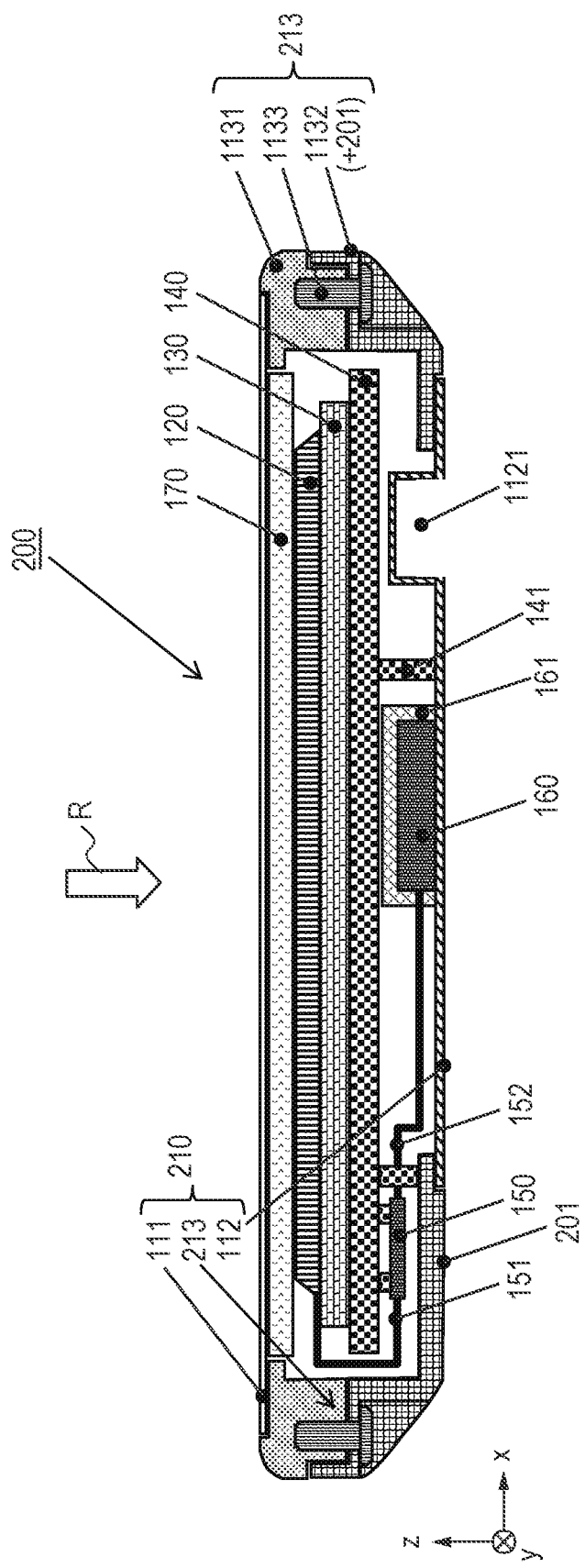
FIG. 5 is a view for illustrating an example of an internal configuration in a cross section taken along the line B-B of FIG. 4, in the radiation imaging apparatus according to the second embodiment.

FIG. 5 is a view for illustrating an example of an internal configuration in a cross section taken along the line B-B of FIG. 4, in the radiation imaging apparatus 200 according to the second embodiment of the present invention. In FIG. 5, configurations similar to the configurations illustrated in FIG. 1A to FIG. 4 are denoted by the same reference symbols, and detailed description thereof is omitted. Further, FIG. 5 shows an xyz coordinate system corresponding to the xyz coordinate system illustrated in FIG. 4.

The radiation imaging apparatus 200 includes, as illustrated in FIG. 5, as a casing 210, the front cover 111, the rear cover 112, and a frame 213. Further, the radiation imaging apparatus 200 includes, as illustrated in FIG. 5, as the frame 213, the front frame member 1131, the rear frame member 1132 including the extending portions 201, and the fixing members 1133.

In this case, the rear cover 112 can be made of, as described in the first embodiment, a resin material in order to reduce the weight. However, when the rear cover 112 is thinned in order to reduce the weight, the rear cover 112 may greatly warp when drop impact or an external force is applied thereto. This warped rear cover 112 may come into contact with the electric board 150 or other components present inside of the casing 210, which results in causing risks of deformation and damage. In view of the above, in balance with the internal components of the casing 210, in a region in which a large warpage of the rear cover 112 cannot be allowed, the extending portion 201 in which the rear frame member 1132 having a higher rigidity extends is provided so that the above-mentioned risks can be avoided. Specifically, in the example illustrated in FIG. 5, in order to avoid the above-mentioned risks with respect to the electric board 150, in the z-direction, the electric board 150 is arranged between the extending portion 201 of the rear frame member 1132 and the above-mentioned sensor.

The rear frame member 1132 can have a higher rigidity as compared to the rear cover 112 by selecting a member having a higher elastic modulus or increasing the thickness. Meanwhile, it is also conceivable to increase the rigidity by partially increasing the thickness of the rear cover 112, by adding a rib, or by other methods, but there are risks of degrading the formability due to the uneven thickness and impairing the external appearance due to sink marks. Accordingly, the configuration of the second embodiment (configuration in which the extending portion 201 is provided) can be used. Further, in order to prevent a cantilever support state with respect to an external force applied to the rear cover 112, a distal end part of the extending portion 201 is supported by, for example, the rib 141 of the base 140 or a spacer (not shown) fixed to the base 140 so that the warpage can be more suppressed. Further, the number of extending portions 201 to be provided and the region thereof can be set as appropriate in accordance with the number of internal components and the arrangement thereof.

Figure 6:
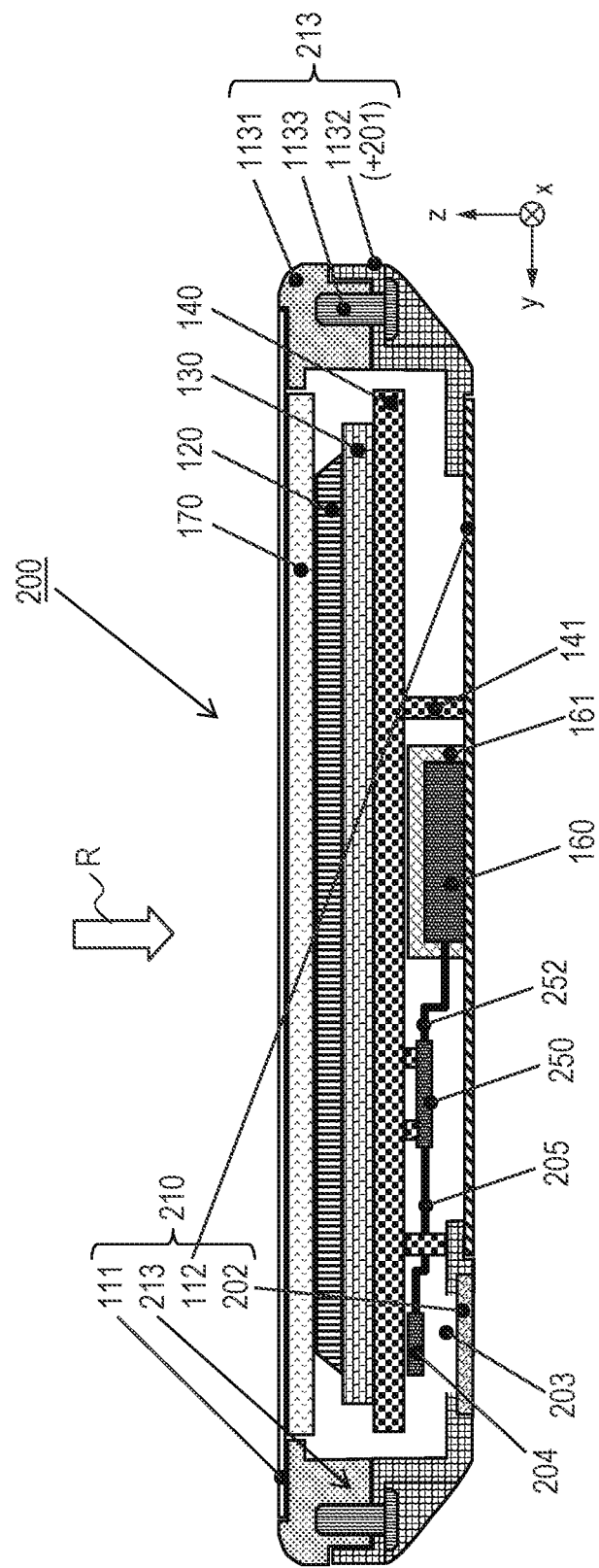
FIG. 6 is a view for illustrating an example of an internal configuration in a cross section taken along the line C-C of FIG. 4, in the radiation imaging apparatus according to the second embodiment.

FIG. 6 is a view for illustrating an example of an internal configuration in a cross section taken along the line C-C of FIG. 4, in the radiation imaging apparatus 200 according to the second embodiment of the present invention. In FIG. 6, configurations similar to the configurations illustrated in FIG. 1A to FIG. 5 are denoted by the same reference symbols, and detailed description thereof is omitted. Further, FIG. 6 shows an xyz coordinate system corresponding to the xyz coordinate system illustrated in FIG. 4 and FIG. 5.

In the radiation imaging apparatus 200, as illustrated in FIG. 6, the casing 210 has an opening 203 formed at a position opposed to the front cover 111 (specifically, in a region of the extending portion 201 of the rear frame member 1132). In addition, in the radiation imaging apparatus 200, as illustrated in FIG. 6, as one configuration of the casing 210, the lid member 202 provided separately from the rear cover 112 is provided so as to cover the opening 203. In this manner, when, for example, a wireless communication unit 204 is arranged as an electric component on the inner side of the casing 210 with respect to the opening 203 in the z-direction, the lid member 202 not interfering with the wireless communication can be arranged. The electric component to be arranged between the opening 203 and the above-mentioned sensor in the z-direction is not limited to the above-mentioned wireless communication unit 204, and may be, for example, a wireless electric supply unit, a speaker, or the like. That is, as the electric component to be arranged between the opening 203 and the above-mentioned sensor, at least one electric component among the wireless communication unit 204, the wireless electric supply unit, and the speaker is applicable.

Further, in FIG. 6, the wireless communication unit 204 is electrically connected to an electric board 250 via a flexible cable 205. Further, the electric board 250 is electrically connected to the battery 160 via a flexible cable 252. At this time, in the second embodiment, the electric board 250 may be the same electric board as the electric board 150 illustrated in FIG. 5, or may be an electric board different from the electric board 150 illustrated in FIG. 5.

As described above, the radiation imaging apparatus 200 according to the second embodiment is configured so that, in addition to the configuration of the radiation imaging apparatus 100 according to the first embodiment, the extending portion 201 is provided to the rear frame member 1132. With this configuration, in addition to the effects in the first embodiment, further, the deformation of the casing 210 can be suppressed so that the internal component can be protected more reliably, and the resistance against drop impact and a load can be further improved.

Third Embodiment

A radiation imaging apparatus according to a third embodiment is described. The radiation imaging apparatus according to the third embodiment is a portable radiation imaging apparatus called an electronic cassette.

Figure 8:
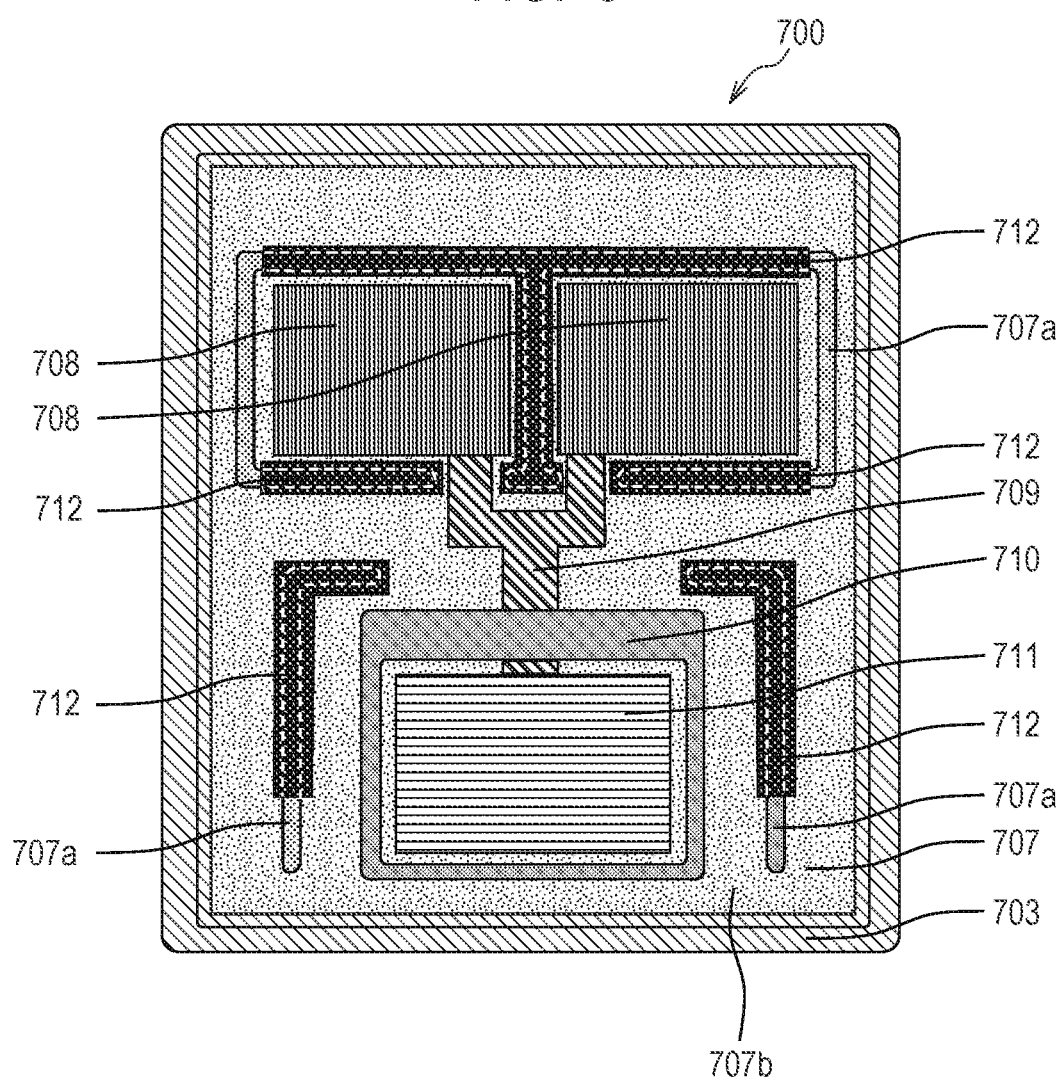
FIG. 8 is a view for illustrating the radiation imaging apparatus according to the third embodiment.

FIG. 7A to FIG. 8 are views for illustrating the radiation imaging apparatus according to the third embodiment. FIG. 7A is a view for illustrating a back surface of the radiation imaging apparatus, and FIG. 7B is a sectional view taken along the line a-a of FIG. 7A. Further, FIG. 8 is a view for illustrating the back surface of the radiation imaging apparatus under a state in which a back-surface plate 704 and a battery cover 902 are not shown.

In the following description, a radiation incident surface (X-ray incident surface) of the radiation imaging apparatus is referred to as "front surface," and a surface opposed to the front surface is referred to as "rear surface (back surface)." Further, in the following description, for the sake of convenience of description, the upper and lower sides and the right and left sides of FIG. 7A and FIG. 8 are referred to as "upper and lower sides" and "right and left sides."

The radiation imaging apparatus includes a thin boxshaped casing 700 forming an exterior member of the radiation imaging apparatus. The casing 700 includes a front frame 701, an incident-surface plate 702 mounted to the front frame 701, a rear frame 703, and a back-surface plate 704 mounted to the rear frame 703.

The front frame 701 is made of a magnesium alloy, an aluminum alloy, or other materials. The incident-surface plate 702 is a member forming an X-ray incident surface, and is made of lightweight and high-rigidity CFRP having small X-ray absorption. The rear frame 703 is made of, similarly to the front frame 701, a magnesium alloy, an aluminum alloy, or other materials. The back-surface plate 704 is a member forming the back surface, and is made of lightweight and high-rigidity CFRP. The back-surface plate 704 has an opening formed so that the battery cover 902 (see FIG. 9A to FIG. 9C and FIG. 11A and FIG. 11B to be referred to later) is mounted to the back-surface plate 704, but FIG. 7A shows a state in which the battery cover 902 is removed. The front frame 701 and the rear frame 703 are fixed to each other by fastening members 705 such as screws. A gasket (not shown) is sandwiched between the front frame 701 and the rear frame 703 so that a sealed space is formed in the casing 700.

The casing 700 accommodates a radiation detecting panel 706, a supporting member 707, electric members 708, and a battery holder 710 in the stated order from the front surface (incident-surface plate 702) side. The radiation detecting panel 706 is formed of a phosphor, such as GOS or CsI, for receiving X-rays that have passed through the subject to be examined and emitting light, and a sensor panel for receiving the light emitted from the phosphor and converting the received light into an electrical signal. The radiation detecting panel 706 functions as an image converting unit for creating an image from a radiation signal. The supporting member 707 has a substantially rectangular panel shape having four sides, and is arranged on the back-surface (back-surface plate 704) side with respect to the radiation detecting panel 706 so as to support the radiation detecting panel 706.

The electric members 708 are installed on a surface 707b of the supporting member 707 on the back-surface side. The battery holder 710 is mounted to the back-surface plate 704 so as to hold a battery 711. As illustrated in FIG. 8, the electric members 708 are supplied with power from the battery 711 via a wiring line 709 so as to drive the radiation detecting panel 706.

In this case, on the supporting member 707, ribs 707a linearly extending along the surface 707b are provided. Each of the ribs 707a forms a protrusion portion projecting in a back-surface direction. The ribs 707a mainly protect the electric members 708 when an external force acts on the casing 700 so that the casing 700 is deformed inward, and are arranged at positions not overlapping the electric members 708 as viewed from the back-surface side, that is, at positions different from the positions of the electric members 708. Further, the rib 707a is arranged so as to surround the electric members 708 so as to more reliably protect the electric members 708. The arrangement of surrounding the electric members 708 is not limited to a case in which the rib 707a is arranged around the entire circumference of the electric members 708, and includes a case in which the rib 707a is arranged in a part of the circumference of the electric members 708.

In the third embodiment, as illustrated in FIG. 8, two electric members 708 are arranged side by side at positions close to an upper end of the casing 700, and the battery holder 710 is arranged at a position close to a lower end of the casing 700. A rib 707a is arranged around substantially the entire circumference (in detail, excluding a position through which the wiring line 709 passes) of the two electric members 708. Further, on the right and left sides of the battery holder 710, substantially L-shaped ribs 707a are arranged. The substantially L-shaped ribs 707a extend parallel to the right and left ends of the battery holder 710, and bend by 90 degrees at their end portions so as to be positioned between the battery holder 710 and the electric members 708.

In addition to the members described here so far, in the casing 700, a shock absorbing member (not shown) for absorbing shock is accommodated. Further, in the casing 700, a shielding member (not shown) is accommodated. The shielding member is arranged, for example, between the radiation detecting panel 706 and the supporting member 707 and at the inner-surface side of the back-surface plate 704, and reduces the influence to the image or the electric members 708 due to scattered X-rays.

Now, a configuration for suppressing occurrence of a contact sound between the back-surface plate 704 and the rib 707a is described. When an external force acts on the back-surface plate 704 so that the back-surface plate 704 is deformed inward, and the back-surface plate 704 comes into contact and collides with the rib 707a, a contact sound is caused inside of the casing 700.

In view of the above, an elastic body 712 is arranged between the back-surface plate 704 and the rib 707a so as to correspond to the rib 707a. When the elastic body 712 is interposed between the back-surface plate 704 and the rib 707a, the occurrence of the contact sound between the back-surface plate 704 and the rib 707a can be suppressed. In this manner, the occurrence of the contact sound inside of the casing 700 can be suppressed, and the quality of the product can be kept.

Arrangement of the elastic body 712 so as to correspond to the rib 707a means, for example, not arrangement of a sheet-shaped elastic body having substantially the same size as the back-surface plate 704, but arrangement of the elastic body 712 in accordance with the arrangement of the rib 707a. The elastic body 712 has, as illustrated in FIG. 8, for example, a wide band shape slightly wider than the width of the rib 707a. When the elastic body 712 is arranged only at a required portion as described above, the weight of the elastic body 712 is reduced, and the lightness of the entire radiation imaging apparatus is prevented from being hindered.

Further, the elastic body 712 may be arranged not between the back-surface plate 704 and the entire rib 707a, but between the back-surface plate 704 and a part of the rib 707a. Specifically, the elastic body 712 can be arranged with respect to a part of the rib 707a positioned at a portion at which the back-surface plate 704 is liable to be deformed. The back-surface plate 704 is liable to be deformed in a center part, and is less liable to be deformed in a peripheral part. In the example of FIG. 8, no elastic body 712 is arranged with respect to parts at the periphery of the back-surface plate 704 (parts close to the right and left ends of the casing 700) of the rib 707a arranged so as to surround the two electric members 708, and the elastic bodies 712 are arranged with respect to parts other than those parts. Further, no elastic body 712 is arranged with respect to parts at the periphery of the back-surface plate 704 (parts close to the lower end of the casing 700) of the substantially L-shaped ribs 707a arranged on the right and left sides of the battery holder 710, and the elastic bodies 712 are arranged with respect to parts other than those parts.

The elastic body 712 can be fixed between the rib 707a and the back-surface plate 704. For example, the elastic body 712 may be fixed to the back-surface plate 704, or may be fixed to an interior component (not shown) arranged between the back-surface plate 704 and the rib 707a. Further, the elastic body 712 can be fixed through adhesion, thread fastening, or other methods so that the elastic body 712 is prevented from being moved. Further, in FIG. 7B, there is a gap between the elastic body 712 and the rib 707a, but this gap may be eliminated. Further, the elastic body 712 has been described as an independent component, but the elastic body 712 may be provided integrally with, for example, the back-surface plate 704 or the interior component (not shown) arranged between the back-surface plate 704 and the rib 707a.

The elastic body 712 is required to have a mechanical strength that prevents the elastic body 712 from being damaged by a stress from the back-surface plate 704 and the rib 707a. Accordingly, in order to achieve both of sound absorbing performance and durability of the elastic body 712, the elastic body 712 can have a Shore A hardness of 70 or more. Further, in order to improve the sound absorbing performance of the elastic body 712, improve the durability thereof, and to achieve lightness, the elastic body 712 can have a density of 1.5 g/cm$^3$ or less. Further, in order to improve the durability of the elastic body 712, the elastic body 712 can be made of a polyurethane resin, for example, an elastomer resin.

In order to reduce the weight of the radiation imaging apparatus, as the material of the back-surface plate 704, a resin material, for example, CFRP is used. In order to reduce the weight of the back-surface plate 704, the back-surface plate 704 can have a thickness of 1.0 mm or less, more suitably 0.6 mm or less. In addition, in order to reduce the weight of the elastic body 712, the elastic body 712 can have a thickness equal to or smaller than the thickness of the back-surface plate 704, and the thickness of the elastic body 712 can be 1.0 mm or less.

Fourth Embodiment

Next, a radiation imaging apparatus according to a fourth embodiment is described. Components similar to those of the radiation imaging apparatus according to the third embodiment are denoted by the same reference symbols, and description thereof is omitted. Differences from the third embodiment are mainly described.

Figure 9A:
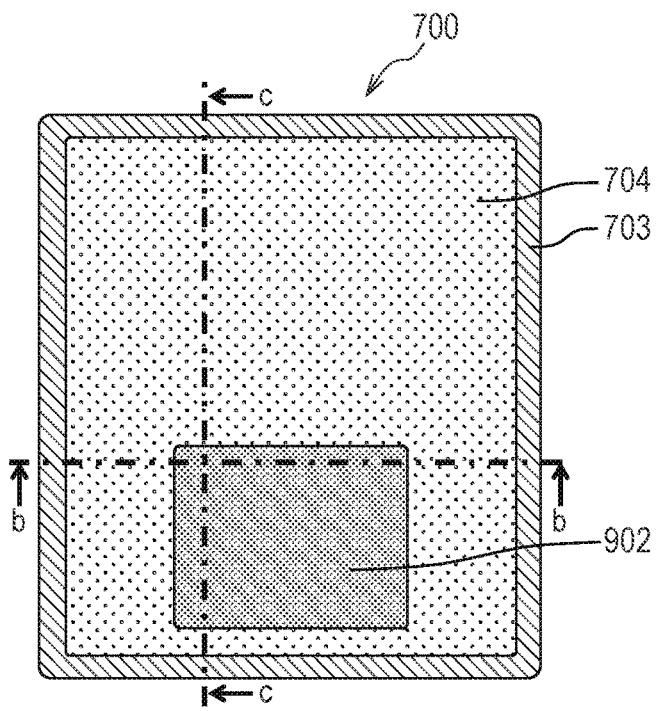
FIG. 9A is a view for illustrating a radiation imaging apparatus according to a fourth embodiment.
Figure 9B:
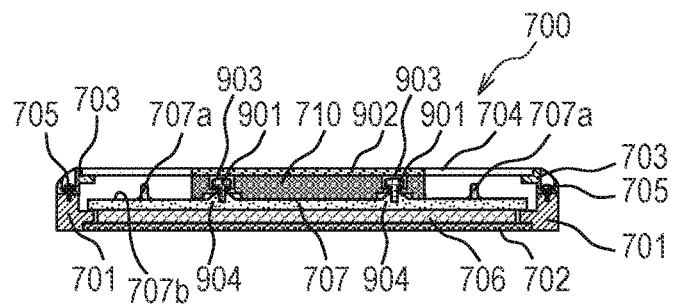
FIG. 9B is a view for illustrating the radiation imaging apparatus according to the fourth embodiment.
Figure 9C:
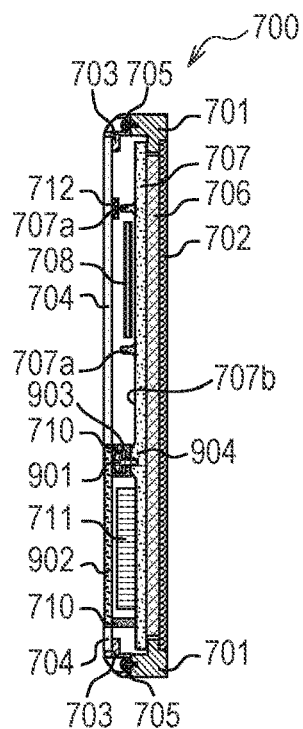
FIG. 9C is a view for illustrating the radiation imaging apparatus according to the fourth embodiment.
Figure 10:
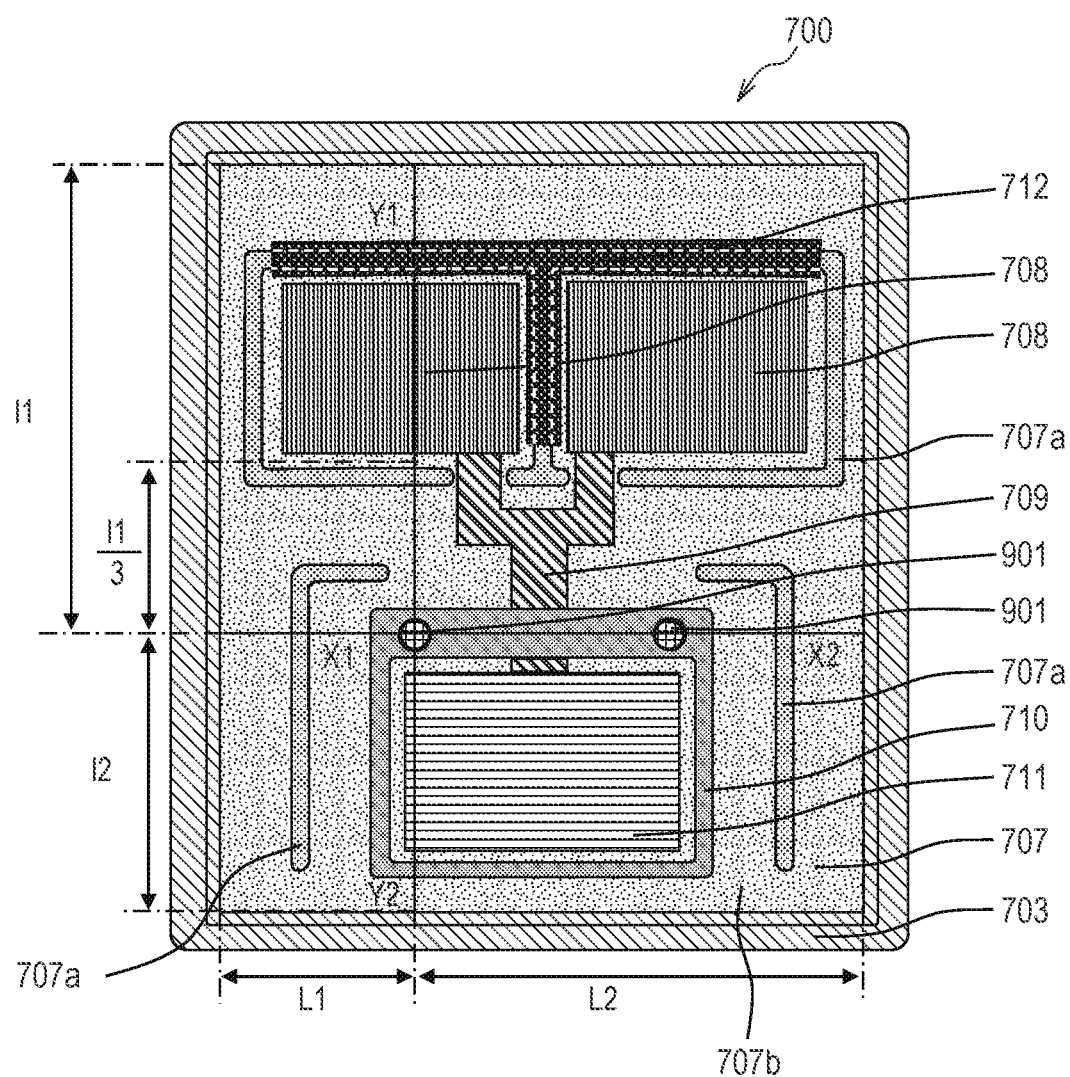
FIG. 10 is a view for illustrating the radiation imaging apparatus according to the fourth embodiment.

FIG. 9A to FIG. 10 are views for illustrating the radiation imaging apparatus according to the fourth embodiment. FIG. 9A is a view for illustrating a back surface of the radiation imaging apparatus. FIG. 9B is a sectional view taken along the line b-b of FIG. 9A. FIG. 9C is a sectional view taken along the line c-c of FIG. 9A. Further, FIG. 10 is a view for illustrating the back surface of the radiation imaging apparatus under a state in which the back-surface plate 704 and the battery cover 902 are not shown. A direction perpendicular to the X-ray incident surface (incident-surface plate 702) and the back surface (back-surface plate 704) is referred to as "thickness direction," and a direction parallel to the X-ray incident surface (incident-surface plate 702) and the back surface (back-surface plate 704) is referred to as "plane direction."

The radiation imaging apparatus according to the fourth embodiment includes first restricting members 901. The first restricting member 901 is a member for connecting between the supporting member 707 and the back-surface plate 704 or a member mounted to the back-surface plate 704. In this manner, relative positions of the back-surface plate 704 and the supporting member 707 in the thickness direction and the plane direction are restricted so that the relative positions of the back-surface plate 704 and the supporting member 707 in the thickness direction and the plane direction are maintained.

In the fourth embodiment, through use of screws being the first restricting members 901, the supporting member 707 and the battery holder 710 mounted to the back-surface plate 704 are fastened to each other. At two right and left portions of the battery holder 710, holes 903 are formed so as to be opened toward the back-surface side. The screws 901 accommodated in those holes 903 are caused to pass through the battery holder 710 so as to be coupled to boss portions 904 provided in the supporting member 707. When the supporting member 707 and the battery holder 710 mounted to the back-surface plate 704 are fastened to each other by the screws 901 as described above, the relative positions of the back-surface plate 704 and the supporting member 707 in the thickness direction and the plane direction are restricted.

When the battery holder 710 and the back-surface plate 704 are connected to each other by the first restricting members 901, as viewed from the back-surface side, the first restricting members 901 can be hidden by the battery cover 902. In this manner, the first restricting members 901 can be brought into an invisible state when the casing 700 is viewed from the outside.

Further, when the thin back-surface plate 704 and the supporting member 707 are connected to each other by the first restricting members 901, there is a fear in that a stress concentrates at the back-surface plate 704 via the first restricting members 901 due to an external force such as drop impact of the casing 700, which may easily cause damage of the back-surface plate 704. When the supporting member 707 and the battery holder 710 thicker than the back-surface plate 704 are connected to each other by the first restricting members 901, the fear of the damage of the back-surface plate 704 can be reduced. The position of the first restricting member 901 and the number of the first restricting members 901 are not particularly limited.

Now, the positional relationship between the elastic body 712 and the first restricting member 901 is described. As described in the third embodiment, the elastic body 712 is provided so as to suppress occurrence of the contact sound between the back-surface plate 704 and the rib 707a.

In the vicinity of the first restricting members 901, the relative positions of the back-surface plate 704 and the supporting member 707 in the thickness direction and the plane direction are restricted, and hence the contact sound between the back-surface plate 704 and the rib 707a itself is less liable to occur. Accordingly, in the vicinity of the first restricting members 901, the elastic body 712 is not required to be arranged with respect to the rib 707a, and the elastic body 712 is only required to be arranged with respect to the rib 707a at a position separated away from the first restricting members 901. In other words, no elastic body 712 is arranged with respect to at least a part of the rib 707a closest to the first restricting members 901.

Straight lines obtained by connecting between, as viewed from the back-surface side as illustrated in FIG. 10, the first restricting member 901 and end portions in directions of sides of the supporting member 707 are considered. Straight lines connecting between the first restricting member 901 and left and right ends of the supporting member 707 are represented by X1 and X2, respectively, and straight lines connecting between the first restricting member 901 and upper and lower ends of the supporting member 707 are represented by Y1 and Y2, respectively. Lengths of the straight lines X1, X2, Y1, and Y2 are represented by L1, L2, l1, and l2, respectively.

In this case, the elastic body 712 is arranged with respect to a part of the rib 707a present on the longest straight line among the straight lines X1, X2, Y1, and Y2. The reason therefor is because, on the longest straight line, the restriction of the relative positions of the back-surface plate 704 and the supporting member 707 in the thickness direction and the plane direction is weakened, and thus there is a fear in that the contact sound between the back-surface plate 704 and the rib 707a is caused. In the example of FIG. 10, the longest straight line is Y1, and hence the elastic body 712 is arranged with respect to at least a part of the rib 707a present on the straight line Y1.

Further, the elastic body 712 is arranged with respect to a part of the rib 707a present on the longest straight line among the straight lines X1, X2, Y1, and Y2 at a position separated away from the first restricting member 901 by ⅓ or more of the length of the longest straight line. In the example of FIG. 10, the length of the longest straight line Y1 is l1, and the elastic body 712 is arranged with respect to a part of the rib 707a present at a position separated away from the first restricting member 901 by (⅓)×l1 or more.

In the fourth embodiment, as is understood from comparison between FIG. 10 and FIG. 8 corresponding to the third embodiment, when the relative positions of the back-surface plate 704 and the supporting member 707 in the thickness direction and the plane direction are restricted, the number of arrangement portions of the elastic bodies 712 can be reduced, and the weight of the radiation imaging apparatus can be reduced.

The arrangement of the elastic body 712 illustrated in FIG. 10 is merely an example, and the present invention is not limited thereto. For example, the elastic body 712 may be arranged in accordance with a rule in which the elastic body 712 is arranged with respect to a part of the rib 707a present at a position separated away from the first restricting member 901 by a predetermined distance.

Fifth Embodiment

Next, a radiation imaging apparatus according to a fifth embodiment is described. Components similar to those of the radiation imaging apparatus according to the third embodiment are denoted by the same reference symbols, and description thereof is omitted. Differences from the third embodiment are mainly described.

Figure 11A:
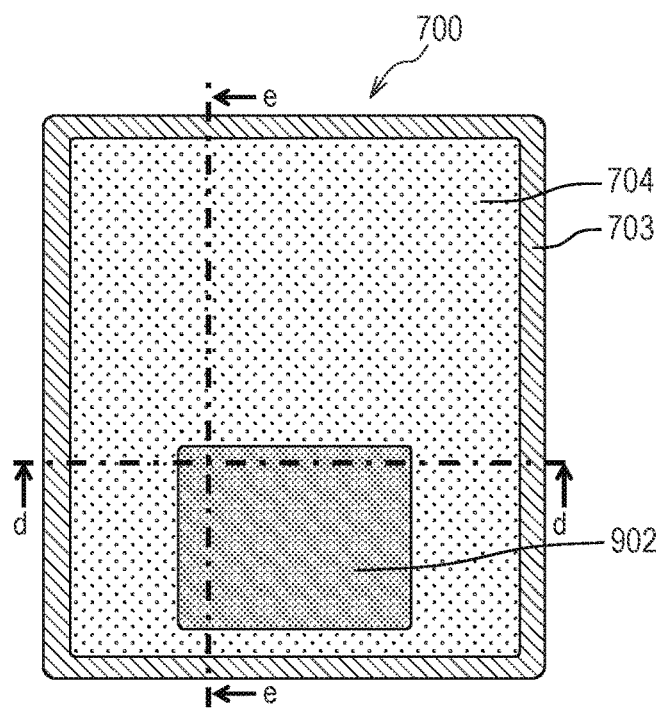
FIG. 11A is a view for illustrating a radiation imaging apparatus according to a fifth embodiment.
Figure 11B:
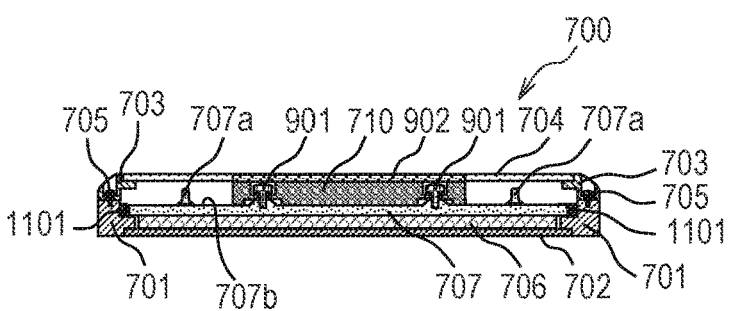
FIG. 11B is a view for illustrating the radiation imaging apparatus according to the fifth embodiment.
Figure 11C:
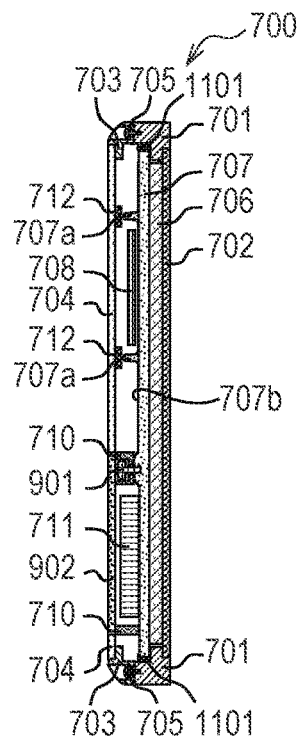
FIG. 11C is a view for illustrating the radiation imaging apparatus according to the fifth embodiment.
Figure 12:
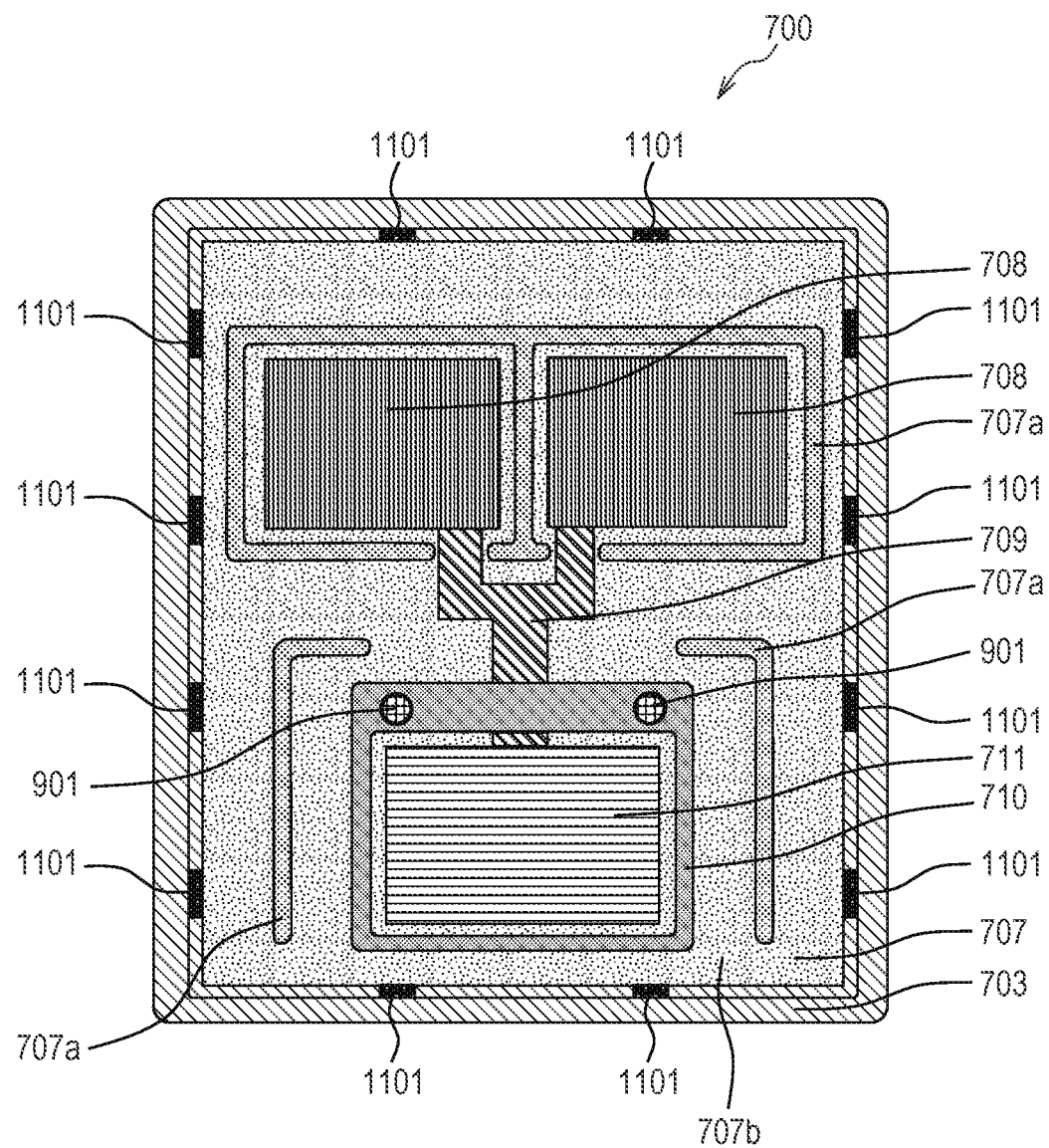
FIG. 12 is a view for illustrating the radiation imaging apparatus according to the fifth embodiment.

FIG. 11A to FIG. 12 are views for illustrating the radiation imaging apparatus according to the fifth embodiment. FIG. 11A is a view for illustrating a back surface of the radiation imaging apparatus. FIG. 11B is a sectional view taken along the line d-d of FIG. 11A. FIG. 11C is a sectional view taken along the line e-e of FIG. 11A. Further, FIG. 12 is a view for illustrating the back surface of the radiation imaging apparatus under a state in which the back-surface plate 704 and the battery cover 902 are not shown. The elastic body 712 is also not shown in FIG. 12, but the elastic body 712 is arranged as appropriate.

Figure 13A:
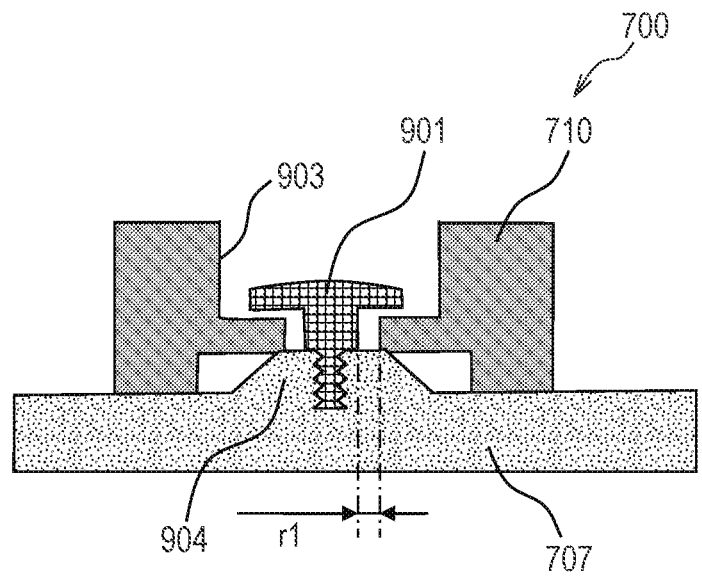
FIG. 13A is a view for illustrating a first restricting member of the radiation imaging apparatus according to the fifth embodiment.
Figure 13B:
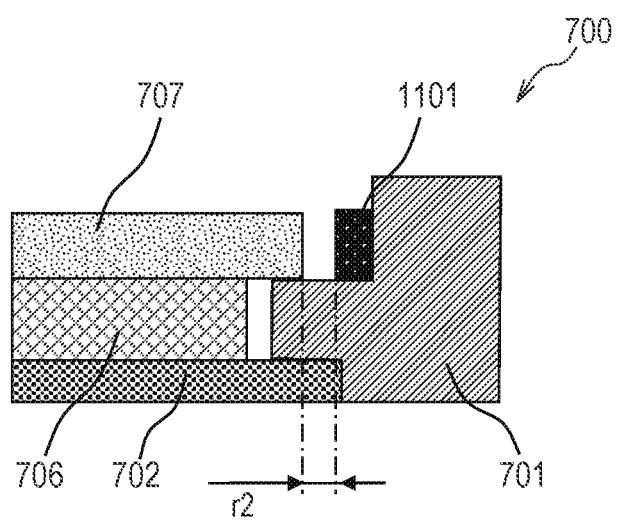
FIG. 13B is a view for illustrating a second restricting member of the radiation imaging apparatus according to the fifth embodiment.

Further, FIG. 13A and FIG. 13B are views for illustrating a first restricting member and a second restricting member, respectively, of the radiation imaging apparatus according to the fifth embodiment. FIG. 13A shows the first restricting member 901, and FIG. 13B shows a second restricting member 1101.

The radiation imaging apparatus according to the fifth embodiment includes the first restricting member 901 and the second restricting member 1101. The first restricting member 901 is, similarly to the fourth embodiment, a member for connecting between the supporting member 707 and the back-surface plate 704 or the member mounted to the back-surface plate 704. However, in the fifth embodiment, the first restricting member 901 restricts the relative positions of the back-surface plate 704 and the supporting member 707 in the thickness direction, and does not restrict the relative positions thereof in the plane direction.

The second restricting member 1101 is arranged between the casing 700 and an end surface of the supporting member 707, and restricts the relative positions of the back-surface plate 704 and the supporting member 707 in the plane direction. The second restricting member 1101 does not restrict the relative positions of the back-surface plate 704 and the supporting member 707 in the thickness direction. The second restricting member 1101 is arranged at the periphery of the casing 700. In this case, the second restricting member 1101 may be arranged in the entire range of the periphery of the casing 700, or as illustrated in FIG. 12, the second restricting members 1101 may be arranged at appropriate intervals at the periphery of the casing 700.

Specifically, as illustrated in FIG. 13A, there is a clearance r1 in the plane direction between the first restricting member 901 and the battery holder 710. The supporting member 707 is allowed to move in the plane direction by an amount of the clearance r1. Further, as illustrated in FIG. 13B, there is a clearance r2 in the plane direction between the second restricting member 1101 and the end surface of the supporting member 707. The supporting member 707 is allowed to move in the plane direction by an amount of the clearance r2. In this case, the clearance r1 is longer than the clearance r2 (r1>r2).

In this manner, for example, a stress to be caused in the plane direction when an external force acts due to impact or the like at the time of dropping the casing 700 from its side surface can be received by the second restricting member 1101. As a result, as compared to a case in which the first restricting member 901 restricts the relative positions of the back-surface plate 704 and the supporting member 707 in the thickness direction and the plane direction, occurrence of a stress in the plane direction with respect to the back-surface plate 704 or the member (battery holder 710) mounted to the back-surface plate 704 can be avoided. Accordingly, the damage of the back-surface plate 704 or the member (battery holder 710) mounted to the back-surface plate 704 can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112565, filed Jul. 7, 2021, and Japanese Patent Application No. 2021-147460, filed Sep. 10, 2021, which are hereby incorporated by reference herein in their entirety.

What is claimed is:

1. A radiation imaging apparatus comprising:
    a sensor configured to detect a radiation and convert the radiation into an electrical signal related to a radiation image; and
    a casing enclosing the sensor,
    wherein the casing includes a front cover having an incident surface which the radiation enters, a rear cover arranged at a position opposed to the front cover, and a frame arranged between the front cover and the rear cover,
    wherein the frame is formed of a plurality of members including a front frame member and a rear frame member which are mountable to and removable from each other, and
    wherein at least one of the front cover or the rear cover is made of a material having a specific gravity smaller than a specific gravity of the frame.

2. The radiation imaging apparatus according to claim 1, wherein the rear frame member is to be coupled to the front frame member.

3. The radiation imaging apparatus according to claim 1, wherein the front frame member and the rear frame member are coupled and integrated with each other through intermediation of a fixing member.

4. The radiation imaging apparatus according to claim 1, wherein the front frame member and the rear frame member are separated away from each other so that the sensor is allowed to be taken in and out of the casing.

5. The radiation imaging apparatus according to claim 1, wherein at least one of the front frame member and the rear frame member is made of a metal.

6. The radiation imaging apparatus according to claim 1, wherein the front frame member and the rear frame member are electrically connected to each other through contact.

7. The radiation imaging apparatus according to claim 1, wherein the frame partially includes an extending portion projecting to an inner side of the rear cover when viewed from a rear cover side.

8. The radiation imaging apparatus according to claim 7, further comprising an electric board between the extending portion and the sensor.

9. The radiation imaging apparatus according to claim 1, wherein the casing has an opening formed at a position opposed to the front cover, and
wherein the radiation imaging apparatus further comprises, between the opening and the sensor, at least one electric component among a wireless communication unit, a wireless electric supply unit, and a speaker.

10. The radiation imaging apparatus according to claim 1, wherein the front cover is made of a resin.

11. The radiation imaging apparatus according to claim 1, wherein at least one of the front cover or the rear cover is made of a carbon fiber reinforced resin.

12. The radiation imaging apparatus according to claim 1, wherein the front cover is bonded to the front frame member with an adhesive material, and the rear cover is bonded to the rear frame member with an adhesive material.

13. The radiation imaging apparatus according to claim 1, wherein the rear cover has a recess portion recessed in a direction inward of the casing, and
wherein the recess portion has a depth of $\frac{1}{2}$ or more of a thickness of the radiation imaging apparatus in a direction in which the radiation enters the radiation imaging apparatus.

14. A radiation imaging apparatus comprising:
a sensor configured to detect a radiation and convert the radiation into an electrical signal related to a radiation image; and
a casing enclosing the sensor,
wherein the casing includes a front cover having an incident surface which the radiation enters, a rear cover arranged at a position opposed to the front cover, and a frame arranged between the front cover and the rear cover,
wherein the frame is formed of a plurality of members including a front frame member and a rear frame member which are mountable to and removable from each other, and
wherein at least one of the front cover or the rear cover includes a conductive part and a non-conductive part, and
wherein the conductive part is electrically connected to the frame.

* * * * *